United States Patent
Dosh et al.

(10) Patent No.: US 8,352,714 B2
(45) Date of Patent: Jan. 8, 2013

(54) EXECUTING WATCHPOINT INSTRUCTION IN PIPELINE STAGES WITH TEMPORARY REGISTERS FOR STORING INTERMEDIATE VALUES AND HALTING PROCESSING BEFORE UPDATING PERMANENT REGISTERS

(75) Inventors: Eran Dosh, Tel Mond (IL); Hagit Margolin, Yoqneam Elit (IL); Assaf Rachlevski, Modiin (IL)

(73) Assignee: LSI Corporation, Milpitas, CA (US)

( * ) Notice: Subject to any disclaimer, the term of this patent is extended or adjusted under 35 U.S.C. 154(b) by 448 days.

(21) Appl. No.: 12/695,267

(22) Filed: Jan. 28, 2010

(65) Prior Publication Data

US 2011/0185156 A1     Jul. 28, 2011

(51) Int. Cl.
*G06F 9/38* (2006.01)
(52) U.S. Cl. ......................................... 712/227; 712/228
(58) Field of Classification Search .......................... None
See application file for complete search history.

(56) References Cited

U.S. PATENT DOCUMENTS

| | | | | |
|---|---|---|---|---|
| 5,706,459 A * | 1/1998 | Atsushi | ................ | 712/200 |
| 6,016,555 A * | 1/2000 | Deao et al. | ................ | 714/35 |
| 6,516,408 B1 * | 2/2003 | Abiko et al. | ................ | 712/227 |
| 6,934,937 B1 * | 8/2005 | Johnson et al. | ................ | 717/129 |
| 2002/0032558 A1 * | 3/2002 | Strong et al. | ................ | 703/22 |

* cited by examiner

*Primary Examiner* — Kenneth Kim
(74) *Attorney, Agent, or Firm* — Mendelsohn, Drucker & Associates, P.C.; Steve Mendelsohn

(57) ABSTRACT

A processor (e.g., a Digital Signal Processor (DSP) core) rewinds a pipeline of instructions upon a watchpoint event in an instruction being processed. The program execution ceases at the instruction in which the watchpoint event occurred, while the instruction and subsequent instructions are cancelled, keeping the hardware components associated with executing the program in their previous states, prior to the watchpoint. The rewind is such that the program is refetched to enable execution to continue from the instruction in which the watchpoint event occurred. The watchpoint event is executed in a "break before make" manner.

20 Claims, 9 Drawing Sheets

| PIPELINE STAGE | | DESCRIPTION | EVENT FOR BREAKING/WATCHPOINT |
|---|---|---|---|
| PROGRAM | P | PROGRAM ADDRESS IS SENT TO MEMORY | |
| READ | R | INSTRUCTION READ | PROGRAM COUNTER (PC) IS AVAILABLE |
| DECODE | D | DECODE THE INSTRUCTION | |
| ADDRESS | A | DATA ADDRESS IS SENT TO MEMORY<br>PROGRAM COUNTER (PC) IS MODIFIED<br>EXECUTION - ARITHMETIC/LOGIC OPERATIONS ON ADDRESS POINTERS<br>ADDRESS POINTERS MODIFICATION | DATA ADDRESS IS AVAILABLE |
| LOAD | L | DATA MEMORY READ<br>LOAD TO DATA REGISTERS | DATA READ VALUE IS AVAILABLE |
| EXECUTE | E | EXECUTION - ARITHMETIC/LOGIC OPERATIONS ON DATA REGISTERS<br>DATA REGISTERS MODIFICATION | |
| STORE | S | WRITE DATA TO MEMORY (STORE) | DATA WRITE VALUE IS AVAILABLE |

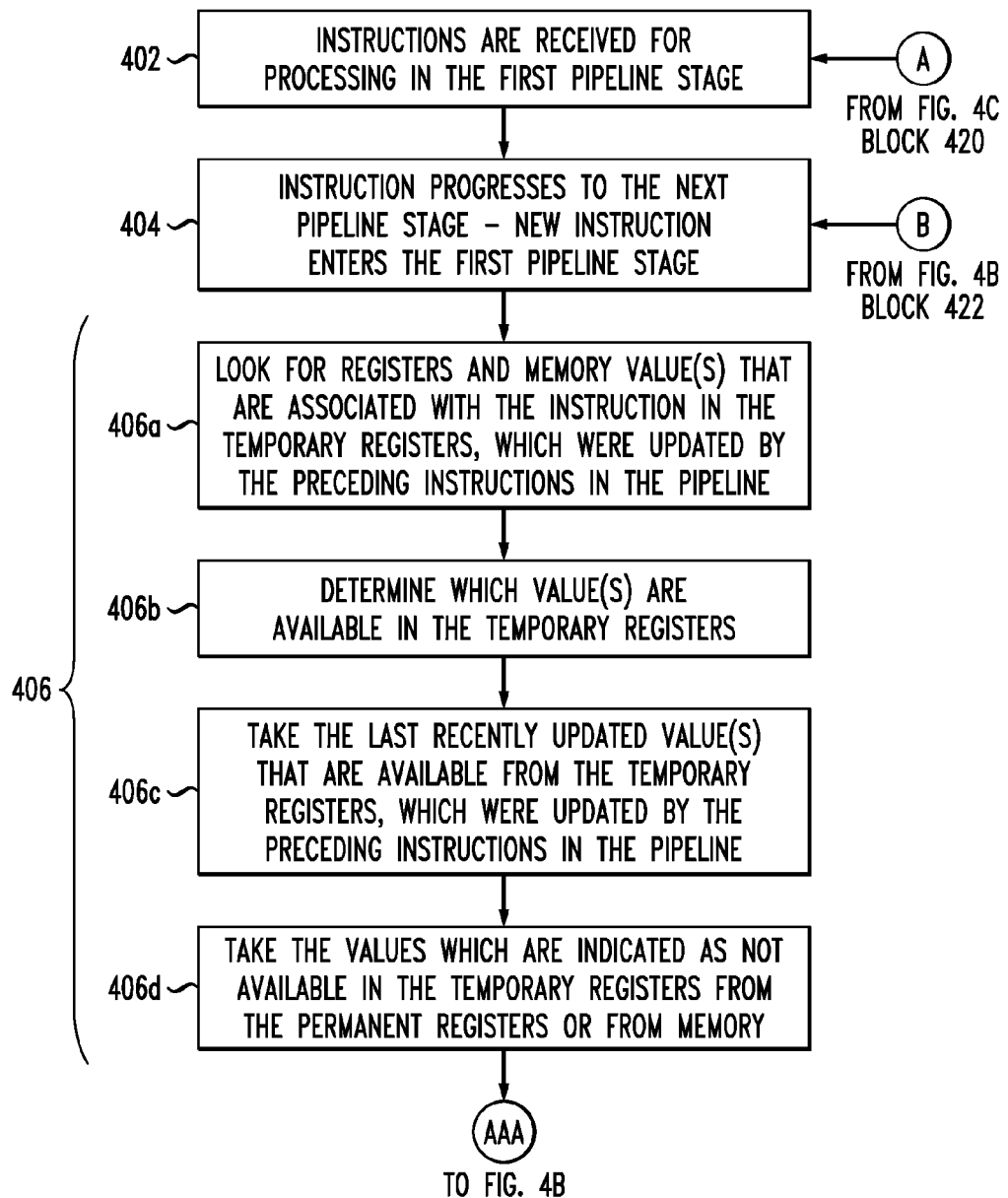

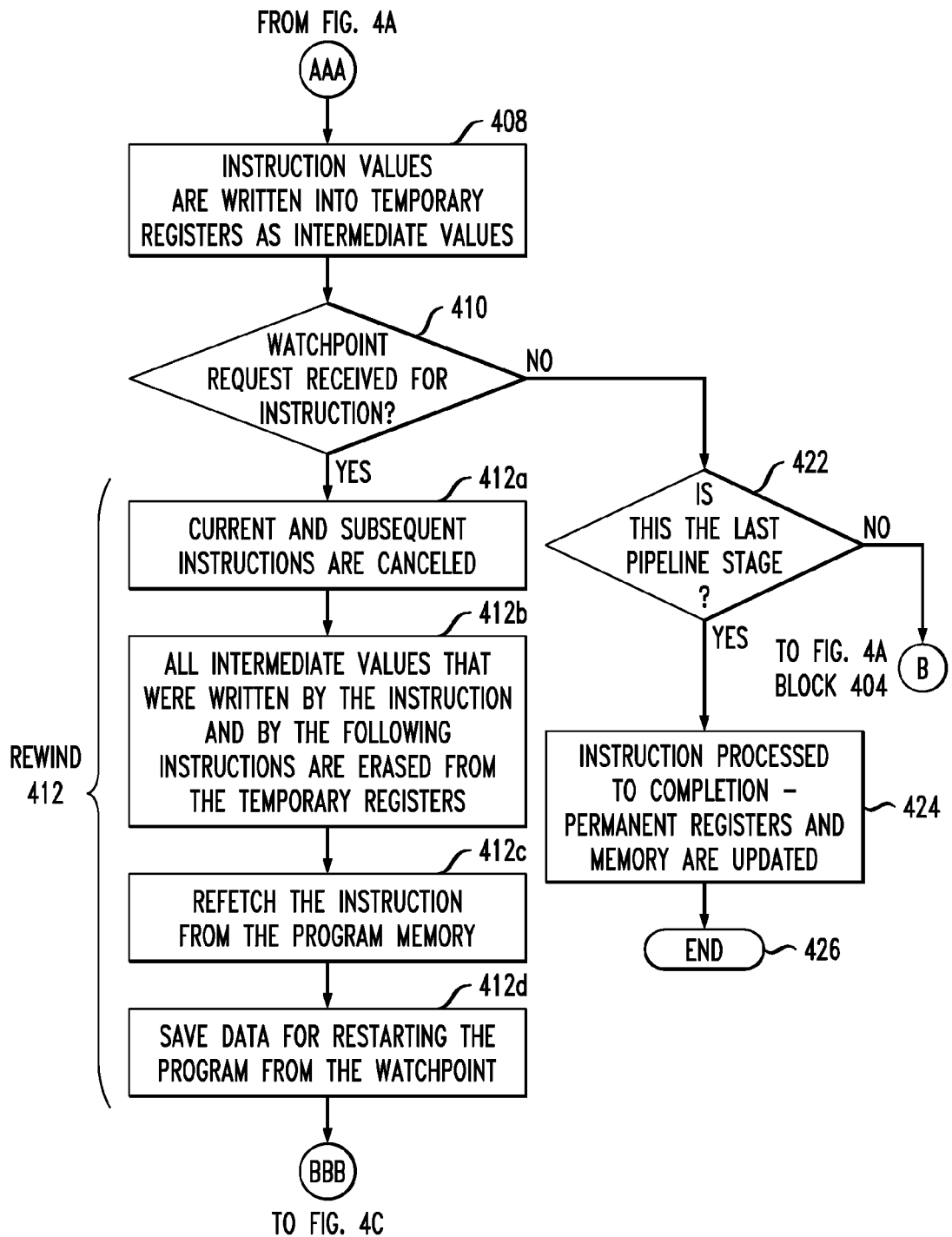

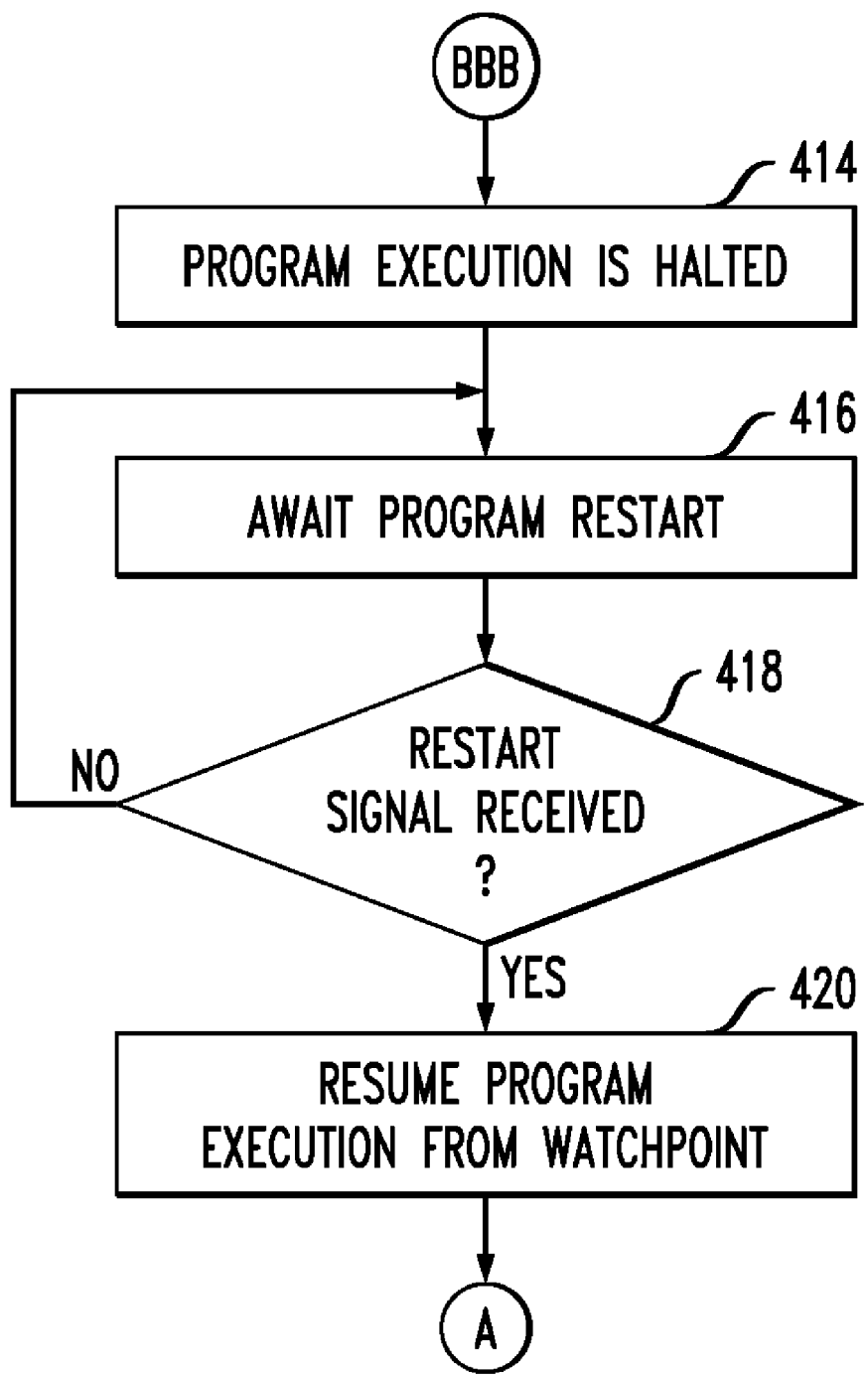

FIG. 6

| PIPELINE STAGE | | DESCRIPTION | INTERMEDIATE VALUES | INFORMATION FOR BREAKING 1) |
|---|---|---|---|---|
| PROGRAM | P | I2 PROGRAM ADDRESS | | |
| READ | R | I2 IS READ FROM PROGRAM MEMORY | | PROGRAM COUNTER (PC) IS AVAILABLE |
| DECODE | D | I2 IS DECODED | | |
| ADDRESS | A | ADDRESS 0x00001000 IS SENT TO MEMORY, R0' IS MODIFIED | R0' = 0x00001004 | DATA ADDRESS IS AVAILABLE |
| LOAD | L | NONE FOR THIS INSTRUCTION | | DATA READ VALUE IS AVAILABLE |
| EXECUTE | E | D3' IS MODIFIED WITH D1+D2 | D3' = 0x00000003 | |
| STORE | S | MEMORY AT *0x00001000' IS MODIFIED WITH THE VALUE 0x00COFFEE | *0x00001000' = 0x00COFFEE | DATA WRITE VALUE IS AVAILABLE |
| | S+1 | ALL INTERMEDIATE VALUES ARE WRITTEN TO THE RESOURCES, IF NO EVENT HAPPENED | | |

US 8,352,714 B2

EXECUTING WATCHPOINT INSTRUCTION IN PIPELINE STAGES WITH TEMPORARY REGISTERS FOR STORING INTERMEDIATE VALUES AND HALTING PROCESSING BEFORE UPDATING PERMANENT REGISTERS

TECHNICAL FIELD

The disclosed subject matter is directed to processors and, in particular to debugging features of processors.

BACKGROUND

Computer programs typically include code with instructions. For debugging purposes, special hardware, for example, in the form of an On-Chip Emulation (OCE) Unit, signals a breakpoint event. One type of breakpoint event is a breakpoint on a data event, known as a watchpoint. Watchpoints are temporary markers that are placed on the program variables, which cause the debugger to initiate a stop at the point the variable was accessed or contained a certain value.

However, since watchpoints are detected upon execution of the instruction, and typically at late stages of the instruction execution, the instruction has already caused modification of various registers and status bits. Moreover, the instruction could not be stopped during execution and continued to completion. Accordingly, the program stopped on the next instruction, and even a few instructions later, as the processor was only able to break or stop, after the instruction or instructions continued to completion.

The situation arising from this breakpoint event, where the processor breaks after the execution of the instruction, or as late as after the execution of multiple instructions, is commonly referred to as "break after make." The instruction or instructions that continued to execute after detection of the breakpoint event, resulted in unwanted and unnecessary modification of internal registers, memory, status bits, etc.

SUMMARY

The disclosed subject matter is directed to systems and methods associated with breakpoint events and, in particular, to a type of breakpoint event known as watchpoints. Breakpoint events may be configured to break program execution when the program reaches a location in the program space for debugging or the like. Watchpoints, for example, may be configured to break program execution when the processor is accessing a certain variable, a certain address in the data memory, or an instruction coupling a certain variable to a certain associated value or address.

The disclosed subject matter is such that, upon detection of a watchpoint in an instruction, the processor breaks the execution of the instruction in which the watchpoint occurred, while the internal registers, memory, and status bits (the internal registers, memory, and status bits known collectively as memory components) remain in their state prior to the break, so as to remain unmodified. This improves the debugging process since the user can examine his program before data events occur that would result in the internal registers and memory being modified. Accordingly, the disclosed systems and methods perform a "break before make."

In one embodiment, a system has memory and a processor implementing instructions in a pipeline manner in which execution of each instruction involves a plurality of stages over a plurality of time cycles. The plurality of stages includes a plurality of non-final stages and a final stage. At a given time cycle, each of a plurality of different instructions is at a different one of the stages in a pipeline. The processor has one or more temporary registers that may be changed during the non-final stages of execution of an instruction and one or more permanent registers that may not be changed during the non-final stages of execution of an instruction. The system detects a watchpoint event associated with execution of a watchpoint instruction at a non-final stage, and the system halting processing of the processor after changing at least one temporary register associated with execution of the watchpoint instruction, but before changing any permanent registers associated with execution of the watchpoint instruction or any subsequent instructions following the watchpoint instruction in the pipeline.

BRIEF DESCRIPTION OF THE DRAWINGS

Attention is now directed to the drawing figures, where like or corresponding numerals indicate like or corresponding components. In the drawings:

FIG. 2 is an exemplary timing diagram showing instructions arranged in a pipeline for processing by the DSP core of FIG. 3;

FIG. 3 is a table of the stages of the pipeline of FIG. 2 for processing each instruction by the DSP core of FIG. 3;

FIGS. 4A-4C are a flow diagram of a process in accordance with the disclosed subject matter;

FIG. 6 is a table of the stages of the pipeline for processing an exemplary instruction I2 by the DSP core of FIG. 3.

DETAILED DESCRIPTION OF THE DRAWINGS

Figure 1:
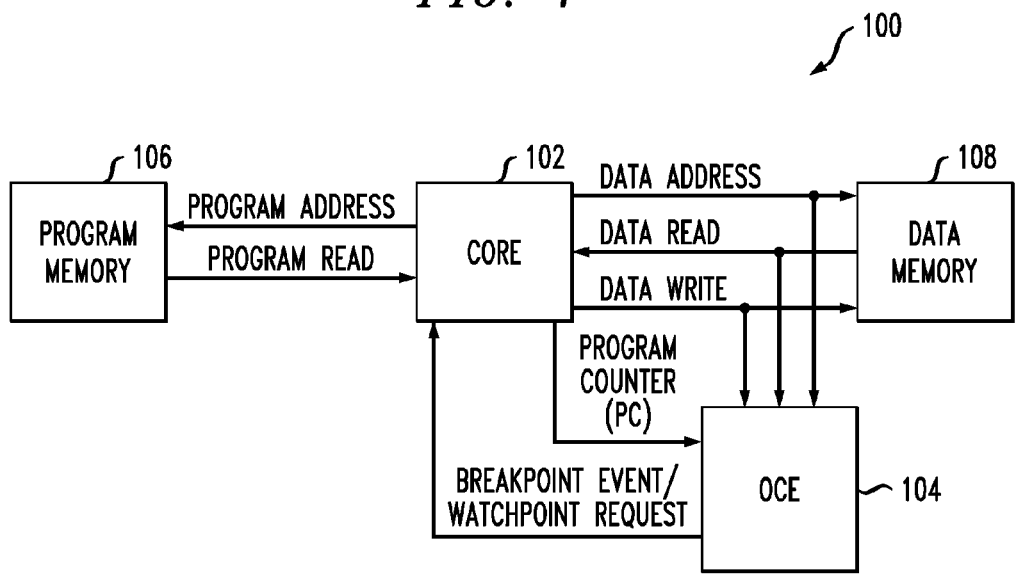
FIG. 1 is a block diagram of an exemplary system on which the disclosed subject matter may operate.

FIG. 1 shows an exemplary system 100 on which the disclosed subject matter operates. System 100 includes a digital signal processor (DSP) core 102 (that, for example, serves as a central processing unit (CPU)) for processing instructions and, for example, is an ARM11 processor from ARM of San Jose, Calif., a C64x+ processor from Texas Instruments of Dallas, Tex., or an MSC 81xx processor from Freescale Semiconductor of Austin, Tex. The system also includes an on-chip emulation (OCE) unit 104 for debugging a program executed by DSP core 102, program memory 106 for storing code for the program, and data memory 108 for storing data input to and generated by the program.

DSP core 102 normally operates at full speed by processing instructions in a pipeline (also referred to herein as a "pipeline of instructions"). DSP core 102 executes instructions in the pipeline in stages, one stage per time cycle. Execution (i.e., processing or implementation) of one instruction is completed after undergoing processing at all of the stages of the pipeline. Different instructions may be processed with other instructions in the same time cycle, but at different stages, such that, upon completion of a stage in a time cycle, all instructions move to the next stage in the next time cycle, until each instruction completes execution at the last stage and time cycle. When instructions are executed in a pipeline, even though a single instruction is completed in a few cycles, the throughput is that, for every cycle, one instruction is completed.

Figure 2:
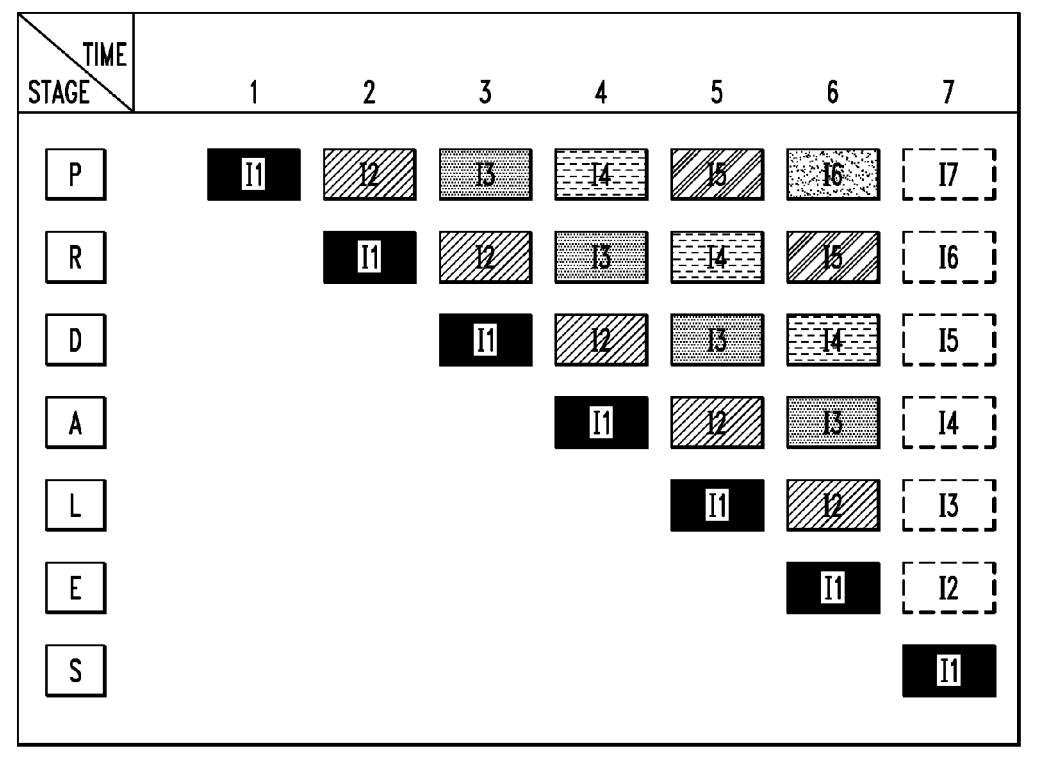

FIG. 2 shows a set of seven instructions I1-I7 that are processed in a pipeline manner at seven consecutive stages by DSP core 102. The seven stages Program (P), Read (R), Decode (D), Address (A), Load (L), Execute (E), Store (S) are represented vertically in FIG. 2 and are defined in FIG. 3. In FIG. 2, each stage is represented by a different row, while each column represents a different time cycle. For example, in time cycle 1, instruction I1 is processed at stage P. In time cycle 2, instruction I1 is processed at stage R, while instruction I2 is processed at stage P. And so on. Note that the processing of instruction I1 is completed at Stage S in time cycle 7. Although not represented in FIG. 2, the processing of instruction I7 would be completed at Stage S in time cycle 13.

As indicated in FIG. 3, a breakpoint-on-PC event can occur at the Decode (D) Stage, where the program counter (PC) is available. A watchpoint can occur at three stages of the pipeline of FIG. 2: i) at the Address (A) Stage, where the data address is available, ii) at the Load (L) Stage, where the data read value is available, and iii) at the Store (S) Stage, where the data write value is available. At these four stages (Decode (D), Address (A), Load (L), and Store (S)), intermediate values, generated by processing of the instruction, are written into the requisite temporary registers of DSP core 102.

DSP core 102 includes registers and status bits, collectively referred to hereinafter as "registers," that provide rapid data access for the central processing unit (CPU) of the DSP core 102. The registers are of two main types: temporary registers and permanent registers. The temporary registers may be erased during processing of an instruction, while the permanent registers may be changed only after completion of the instruction.

DSP core 102 is of an architecture that writes all values processed by an instruction into temporary registers, such that these values are intermediate values. The intermediate values in the temporary registers are used by the subsequent (following) instructions when these values are requested for processing the instruction associated with the value(s). If the intermediate value does not exist or is not present in a temporary register, then it is taken from the corresponding permanent value in the permanent register or memory associated with this value. The intermediate values in the temporary registers are then written into permanent registers as permanent values when execution of the instruction is complete.

OCE unit 104 monitors the core buses and the program counters (PCs) to detect a breakpoint event, e.g., a breakpoint-on-PC event or a watchpoint. OCE unit 104 also signals DSP core 102 to halt execution of the program of instructions.

The system 100 operates by rewinding the individual instructions that move in the pipeline, processed and executed by DSP core 102, after a breakpoint event, for example, a watchpoint, has occurred, having been detected by the OCE unit 104. The pipeline of instructions resumes from the point of the watchpoint (for example, with the instruction in which the watchpoint occurred) upon receiving an indicator, e.g., signal or the like, to restart the program.

OCE unit 104 is programmed for the breakpoint event, e.g., the watchpoint, and DSP core 102 retains enough information about the point (in the pipeline of instructions) at which the program will resume, once OCE unit 104 signals DSP core 102 to restart the program. For example, a branch delay slot instruction or jump delay slot instruction is an instruction that is located immediately after a branch or jump instruction and executed even if the preceding branch or jump is taken. Thus, it appears that these instructions are executing in an incorrect order. Therefore, if a delay slot of a branch or jump instruction was marked for a breakpoint-on-PC event, or instruction in which a watchpoint occurred, DSP core 102 keeps map information, which includes i) at least a target data address and ii) an indication of the delay slot. With this information, the requisite data can be accessed, such that DSP core 102 goes from a breakpoint state to resuming the execution state for the program.

FIGS. 4A-4C illustrate an exemplary process for the disclosed subject matter. DSP core 102 is designed and configured to perform this process. Initially, at block 402, DSP core 102 reads an instruction for processing, from a program of instructions, and sends the instruction to the first stage of the pipeline. This initial instruction enters the first pipeline stage. As the initial instruction moves to the next pipeline stage, a subsequent instruction enters the first pipeline stage, at block 404.

DSP core 102 looks for registers and memory values that are associated with the instruction and are used as sources for the instruction execution, in the temporary registers, which were updated by the preceding instructions in the pipeline, at block 406a. It is then determined which, if any, values are in the temporary registers, at block 406b. The values that exist in the temporary registers, if any, are then read from the most-recently updated temporary registers, which were updated by the preceding instructions in the pipeline, at block 406c. Other values that do not exist in the temporary registers are read from the permanent registers or memory (of the data memory 108), at block 406d.

The process then moves to block 408. At block 408, the updated instruction values are then written into temporary registers in the DSP core 102 as intermediate values.

The process moves to block 410, where, if DSP core 102 receives a watchpoint request that is sent from OCE unit 104, the pipeline of instructions is rewound. The process of rewinding the pipeline of instructions, or rewind 412, begins and includes four subprocesses indicated by blocks 412a-412d. While the subprocesses for rewinding the pipeline of instructions are described in the order of blocks 412a-412d, this order is exemplary only and any suitable order of the subprocesses of blocks 412a-412d is permissible.

At block 412a, DSP core 102 cancels the instruction that was requested in which the watchpoint occurred. All instructions that preceded the instruction in which the watchpoint occurred are executed by DSP core 102, while all subsequent instructions following the instruction in which the watchpoint occurred are canceled. This means that DSP core 102 may continue to operate for a few more time cycles to enable execution of the preceding instructions to be completed. The exact number of cycles will depend on the stage at which the watchpoint occurred, which in turn dictates the number of preceding instructions that are still in the pipeline. For example, referring again to FIGS. 2 and 3, if a watchpoint occurs for instruction Ij at the Address Stage in time cycle k, then there will be three preceding instructions I(j−1), I(j−2), and I(j−3) (at Stages L, E, and S, respectively) and three subsequent instructions I(j+3), I(j+2), and I(j+1) (at Stages P, R, and D, respectively) in the pipeline in time cycle k. Since execution of instruction I(j−3) will be completed in time cycle k, DSP core 102 will need to operate for two more cycles to enable execution of instructions I(j−1) and I(j−2) to be completed, before canceling execution of watchpoint instruction Ij and the three subsequent instructions I(j+1), I(j+2), and I(j+3).

All intermediate values that were written by the watchpoint instruction and by the subsequent instructions are erased from the temporary registers at block 412b. The temporary registers are erased for all canceled instructions.

The instruction in which the watchpoint occurred is refetched from the program memory 106, at block 412c.

At block 412d, DSP core 102 saves, for example, in internal dedicated registers, data necessary to restart the program of instructions from the point where it was stopped by the watchpoint. The data that is saved includes, for example, (i) a target address for a jump or branch delay slot instruction and (ii) the fact that the instruction in which the watchpoint occurred is a delay slot instruction. For example, the target address is the calculated or decoded target address of the last completely executed instruction, prior to the canceled instruction, if this was a delayed jump or branch instruction. However, if the instruction in which the watchpoint occurred is not a delay slot instruction, then the fact that this instruction is a non-delay slot is saved, absent any target address.

With the four subprocesses (of blocks 412a-412d) complete, the pipeline of instructions has now been rewound. DSP core 102 halts the execution of the program of instructions at block 414. The program has reverted to a state before the stage of execution of the instruction for which the watchpoint occurred. This may involve DSP core 102 operating for one or more time cycles to re-execute one or more of the initial stages for the watchpoint instruction and possibly one or more of the subsequent instructions.

DSP core 102 is now in a breakpoint state or debug mode, at block 416. DSP core 102 then awaits a signal from OCE unit 104 to restart the program and return to an active state. At this non-active state, the programmer can examine the registers and memory content (in the data memory 108) related to his code.

The process moves to block 418. If the restart signal is not received, then DSP core 102 waits in a debug mode at block 416 for the restart signal. Once the restart signal is received, at block 420, program execution resumes from the instruction that caused the breakpoint or watchpoint, this instruction already having been fetched and ready to continue execution. The process then resumes from block 402.

Returning to block 410, if a watchpoint request is not received for the executing instruction, then the process moves to block 422. At block 422, it is determined if this is the last stage for processing the instruction. If this is not the last stage for the instruction, then the process returns to block 404. However, if this is the last stage for the instruction, then the process moves to block 424, where the instruction is processed to completion, and the permanent registers and the memory are updated. The process then ends at block 426.

Figure 5:
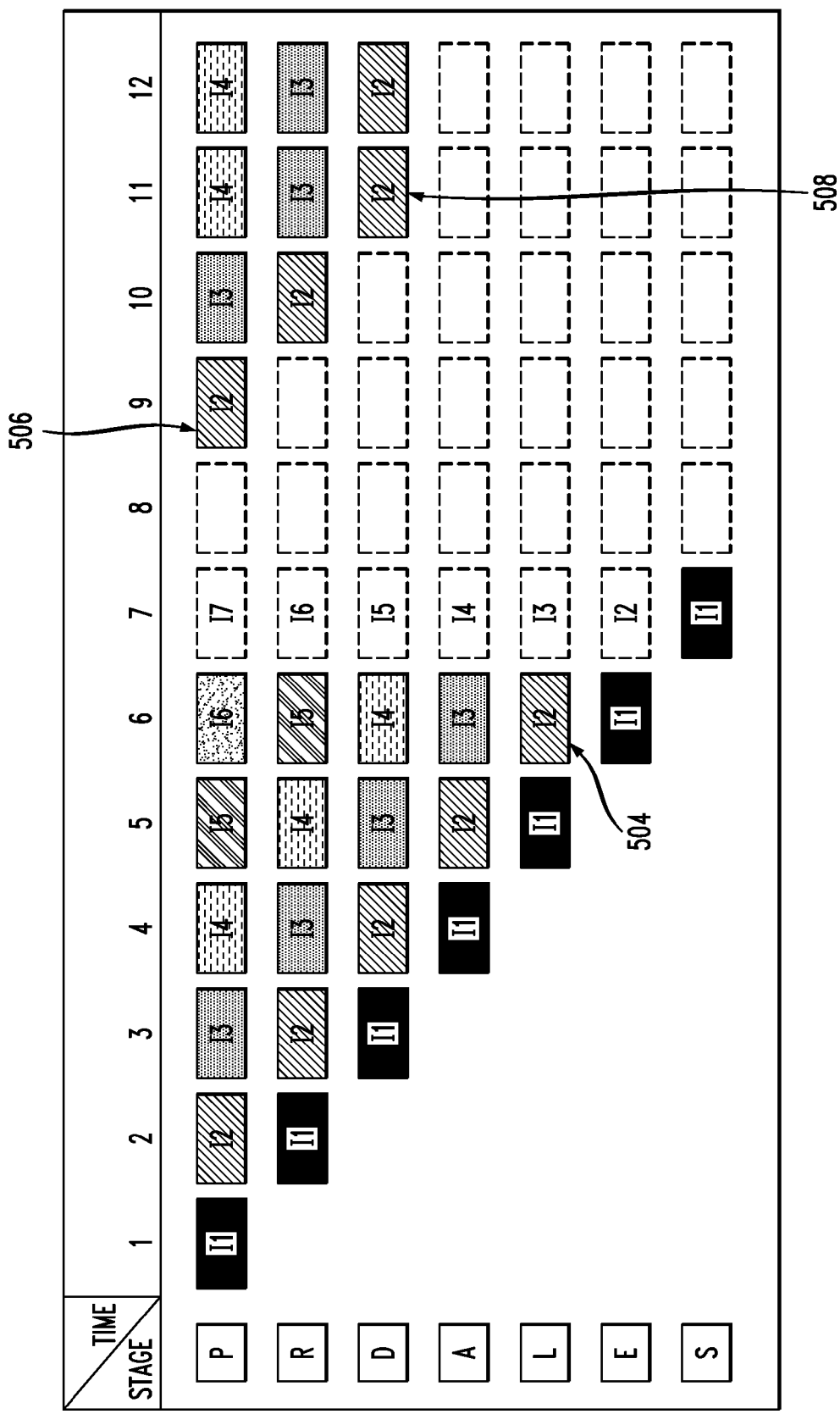
FIG. 5 is a timing diagram of the pipeline processed by the DSP core of FIG. 3 in accordance with the disclosed subject matter.

FIG. 5 details the process of FIGS. 4A-4C in the form of a timing diagram. In FIG. 5, time is broken into twelve time cycles across the top row with the different time cycles numbered 1 through 12. The program pipeline stages are listed in the rows under the "Stage" designation, with each letter corresponding to the respective program pipeline stage of FIG. 3. Instructions are indicated by boxes, with the specific instructions I1 to I7 indicated.

For example, focus is on instruction I2. For this instruction, the breakpoint event (i.e., watchpoint) request (of block 410) was received at DSP core 102 for Instruction I2 at stage "L" in time cycle 6, as indicated by the arrow 504. After DSP core 102 operates for one more time cycle to enable execution of instruction I1 to complete, the I2 instruction is canceled, as well as subsequent instructions I3-I7 (block 412a) with the intermediate values in the registers erased (block 412b). Instruction I2 is refetched from the program memory 106 (block 412c), as indicated by arrow 506, at stage "P" in time cycle 9. Data from the I1 instruction is saved (block 412d) during this time, since instruction I1 was the last fully executed instruction. The I2 instruction gets to the "D" (Decode) stage in time cycle 11, as indicated by the arrow 508, and stops at time cycle 11 (program execution halted at block 414), while DSP core 102 waits for commands from the debugger to restart and ultimately resume the program of instructions (blocks 416, 418, and 420).

FIG. 6 is a table detailing the functioning of intermediate values and how they are erased, in accordance with subprocess 412b, detailed above. For example, values of the registers and memory, before execution of an example instruction I2, are as follows:

D0=0x00COFFEE,R0=
  0x00001000,*0x00001000=0x00000000,
  D1=0x00000000,D2=0x00000002,
  D3=0x00000000

The sample Instruction I2 is as follows:

I2:MOVE.LD0,(R0)+ADD D1,D2,D3

The instruction I2 performs the following: 1) Write the contents of D0 register (4 bytes) to the address that is pointed by R0; 2) R0=R0+4 (since access is 4 bytes); and 3) D3=D1+D2.

From the table of FIG. 6, execution of the instruction I2 has resulted in Intermediate values R0' (for R0), D3' (for D3) and *0x00001000' (for *0x00001000), since these values R0 and D3 are not yet permanently written into the registers and address 0x00001000 in the data memory was not yet modified, as the watchpoint occurs during execution of the instruction (I2), before the execution is complete.

The breakpoint-on-PC event can occur at the Decode (D) Stage, where the PC is available. A watchpoint can occur at three stages of the pipeline when: i) a data address is available; ii) a data read value is available; or iii) a data write value is available. Accordingly, the intermediate values can be erased at stage "L", which is one stage after access to a specific address for reading or writing any value; at stage "E", which is one stage after access to a specific address for reading a specific value; and at stage "S+1", which is one stage after access to a specific address for writing a specific value. The intermediate values can be erased at any of stages "L", "E", and "S+1."

Figure 7:
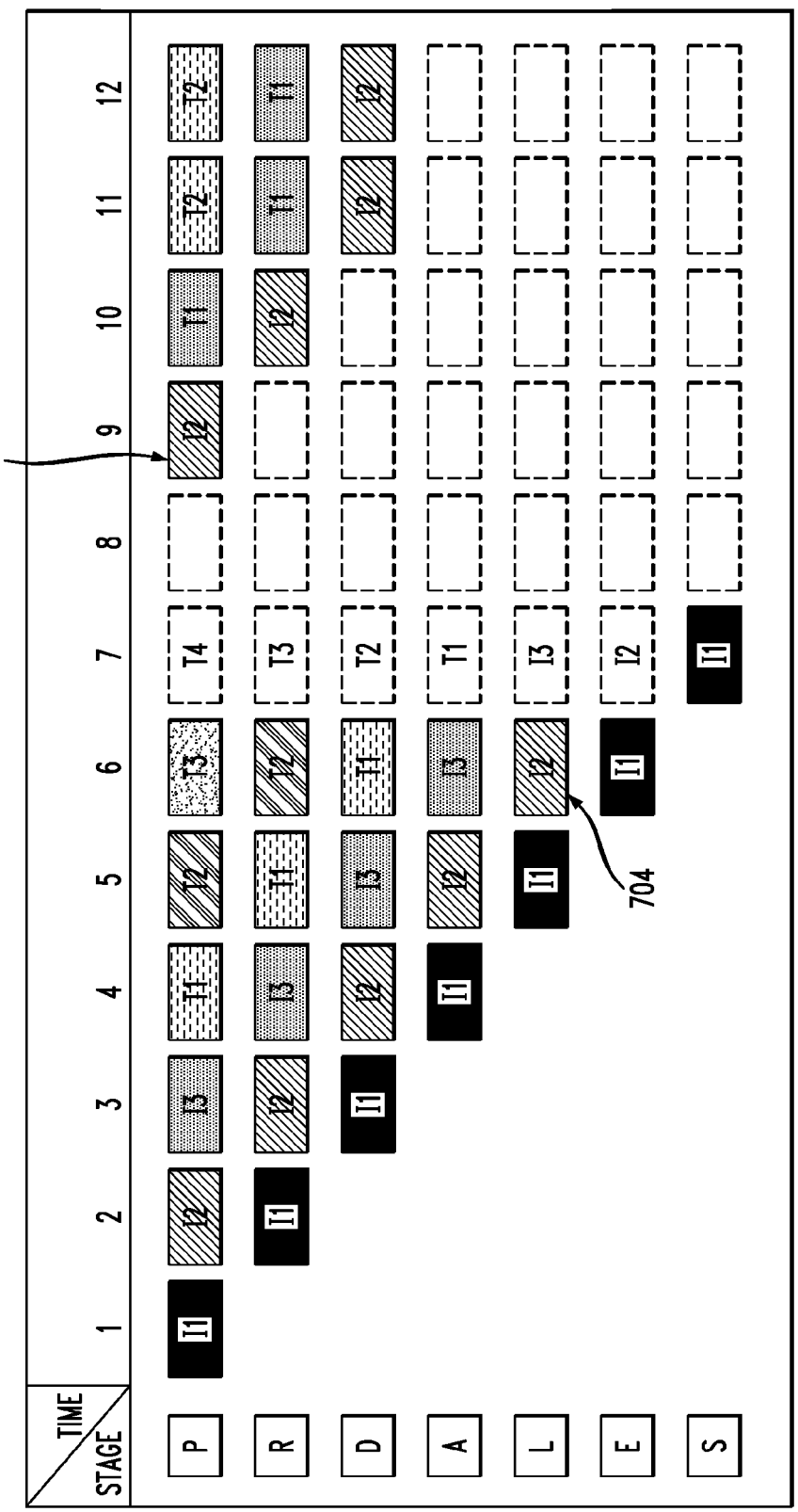
FIG. 7 is a timing diagram of the pipeline processed by the DSP core of FIG. 3 in accordance with the disclosed subject matter.

FIG. 7 is a timing diagram for a DSP core 102 that implements a delayed change of flow (COF), where the instruction I1 uses a delay slot. Instruction I2 is the instruction where the watchpoint occurs, as indicated by the arrow 704. To rewind the pipeline and resume execution of the program after the watchpoint, DSP core 102 keeps enough information (e.g., data) so that it can restart execution from the point the program of instructions stopped, that is, the last instruction before the watchpoint.

This is represented by the following code:

```
I1: JMPD_label ADD D0, D1, D2 ;This instruction is a delayed COF
I2: MOVE.L (R0)+, D0 ; This instruction is a delay slot, there is a discontinuity here
   as the Jump (JMP) instruction takes effect.
   *******discontinuity*******
_label:
T1: ADD D0, D1, D2
```

Since I2 is the instruction that is canceled, and it is also a delay slot instruction, and since instruction I1 completes execution, including changing the PC to be the target address instruction T1, since JMPD_label represents jumping to the target address for instruction T1, the DSP core 102 acts as follows. The DSP core 102 cancels instruction I2 during the time instruction I1 is finishing execution. By keeping a portion of the I1 instruction, e.g., the JMPD_label and an indication of the delay slot (e.g., instruction I2), the DSP core 102 can resume execution of the program from instruction I2, followed by instruction T1.

With the data from the I1 instruction saved, DSP Core 102 refetches instruction I2, for example, at time slot 9 at the program or "P" Stage, as represented by the arrow 706. Following the refetch of instruction I2, the DSP core 102 fetches the target address, which was kept from instruction I1. Resumption of the program from instruction I2 of the code includes instruction I2 followed by instruction T1, thereby performing the correct sequence of the program.

Instructions T2, T3, T4, . . . , are then executed, in accordance with the pipeline of instructions I1, I2, T1, T2, T3, T4, . . . .

The disclosed subject matter also allows for breaking on any instruction that causes a breakpoint event or watchpoint before the processor registers update, or before any change of memory. For example, this may occur in processors that implement a delayed change of flow (COF) and utilize delay slot instructions, which were requested for breakpoint on Program Counter (PC), or were detected for a watchpoint.

Although the disclosed subject matter has been described in the context of a processor (i.e., DSP core 102) having the seven stages of execution of P, R, D, A, L, E, and S for each instruction, the disclosed subject matter is not so limited and may include processors having other numbers and other types of stages of execution.

In the following claims, a system is said to comprise a processor. In the context of FIG. 1, system 100 is an example of the claimed system, where DSP core 102 is an example of the claimed processor.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The above-described processes, including portions thereof, can be performed by software, hardware, and combinations thereof. These processes and portions thereof can be performed by computers, computer-type devices, workstations, processors, micro-processors, other electronic searching tools and memory, and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the disclosed subject matter have been described, so as to enable one of skill in the art to practice the present disclosed subject matter, the preceding description is intended to be exemplary only. It should not be used to limit the scope of the disclosed subject matter, which should be determined by reference to the following claims.

The invention claimed is:

1. A method for operating a system having memory and a processor implementing instructions in a pipeline manner in which execution of each instruction involves a plurality of stages over a plurality of time cycles, wherein:
   (i) the plurality of stages includes a plurality of non-final stages and a final stage;
   (ii) at a given time cycle, each of a plurality of different instructions is at a different one of the stages in a pipeline; and
   (iii) the processor has one or more temporary registers that (i) store intermediate values generated by processing instructions and (ii) may be changed during the non-final stages of execution of an instruction and one or more permanent registers that may not be changed during the non-final stages of execution of an instruction, the method comprising:
   the system detecting a watchpoint event associated with execution of a watchpoint instruction at a non-final stage; and
   the system halting processing of the processor after changing at least one temporary register associated with execution of the watchpoint instruction, but before changing any permanent registers associated with execution of the watchpoint instruction or any subsequent instructions following the watchpoint instruction in the pipeline, wherein, before halting the processing of the processor, the processor fetches appropriate data from the temporary registers, the permanent registers, or the memory for at least one instruction in the pipeline.

2. The invention of claim 1, wherein, before halting the processing of the processor, the processor operates for one or more time cycles following detection of the watchpoint event to complete execution of one or more preceding instructions preceding the watchpoint instruction in the pipeline, wherein completion of execution of the one or more preceding instructions may change one or more associated permanent registers.

3. The invention of claim 1, wherein, before halting the processing of the processor, the processor erases any intermediate values written to any temporary registers by the watchpoint instruction and any subsequent instruction in the pipeline.

4. The invention of claim 1, wherein the system halts the processing of the processor in a "break before make" manner.

5. The invention of claim 1, wherein, before halting the processing of the processor, the processor operates for at least one time cycle to execute at least one non-final stage for the watchpoint instruction to place the processor in an equivalent state equivalent to the state prior to detection of the watchpoint event.

6. The invention of claim 5, wherein, before halting the processing of the processor, the processor operates for two or more time cycles to execute two or more non-final stages for the watchpoint instruction and at least one stage for at least one subsequent instruction to place the processor in the equivalent state.

7. The invention of claim 1, wherein, after halting the processing of the processor, the processor resumes processing of the watchpoint instruction in the pipeline.

8. The invention of claim 7, wherein the processor stores data to enable the processor to resume processing of the watchpoint instruction in the pipeline.

9. The invention of claim 8, wherein the stored data includes a target data address and an indication of whether the watchpoint instruction is a delay slot instruction.

10. The invention of claim 1, wherein the system further comprises an emulation unit that detects the watchpoint event, instructs the processor to halt its processing, and subsequently instructs the processor to resume its processing.

11. The invention of claim 10, wherein the processor, the memory, and the emulation unit are implemented as a single integrated circuit.

12. The invention of claim 4, wherein:
before halting the processing of the processor, the processor operates for one or more time cycles following detection of the watchpoint event to complete execution of one or more preceding instructions preceding the watchpoint instruction in the pipeline, wherein completion of execution of the one or more preceding instructions may change one or more associated permanent registers;
before halting the processing of the processor, the processor erases any intermediate values written to any temporary registers by the watchpoint instruction and any subsequent instruction in the pipeline;
before halting the processing of the processor, the processor operates for at least one time cycle to execute at least one non-final stage for the watchpoint instruction to place the processor in an equivalent state equivalent to the state prior to detection of the watchpoint event;
after halting the processing of the processor, the processor resumes processing of the watchpoint instruction in the pipeline, wherein the processor stores data to enable the processor to resume processing of the watchpoint instruction in the pipeline; and
the system further comprises an emulation unit that detects the watchpoint event, instructs the processor to halt its processing, and subsequently instructs the processor to resume its processing, wherein the processor, the memory, and the emulation unit are implemented as a single integrated circuit.

13. A method for operating a system having memory and a processor implementing instructions in a pipeline manner in which execution of each instruction involves a plurality of stages over a plurality of time cycles, wherein:
(i) the plurality of stages includes a plurality of non-final stages and a final stage;
(ii) at a given time cycle, each of a plurality of different instructions is at a different one of the stages in a pipeline; and
(iii) the processor has one or more temporary registers that (i) store intermediate values generated by processing instructions and (ii) may be changed during the non-final stages of execution of an instruction and one or more permanent registers that may not be changed during the non-final stages of execution of an instruction, the method comprising:
the system detecting a watchpoint event associated with execution of a watchpoint instruction at a non-final stage; and
the system halting processing of the processor after changing at least one temporary register associated with execution of the watchpoint instruction, but before changing any permanent registers associated with execution of the watchpoint instruction or any subsequent instructions following the watchpoint instruction in the pipeline, wherein, before halting the processing of the processor, the processor erases any intermediate values written to any temporary registers by the watchpoint instruction and any subsequent instruction in the pipeline.

14. A system comprising:
memory; and
a processor that implements instructions in a pipeline manner in which execution of each instruction involves a plurality of stages over a plurality of time cycles, wherein:
the plurality of stages includes a plurality of non-final stages and a final stage;
at a given time cycle, each of a plurality of different instructions is at a different one of the stages in a pipeline;
the processor has one or more temporary registers (i) store intermediate values generated by processing instructions and (ii) that may be changed during the non-final stages of execution of an instruction and one or more permanent registers that may not be changed during the non-final stages of execution of an instruction;
the system detects a watchpoint event associated with execution of a watchpoint instruction at a non-final stage; and
the system halts processing of the processor after changing at least one temporary register associated with execution of the watchpoint instruction, but before changing any permanent registers associated with execution of the watchpoint instruction or any subsequent instructions following the watchpoint instruction in the pipeline, wherein, before halting the processing of the processor, the processor fetches appropriate data from the temporary registers, the permanent registers, or the memory for at least one instruction in the pipeline.

15. The invention of claim 14, wherein, before halting the processing of the processor, the processor operates for one or more time cycles following detection of the watchpoint event to complete execution of one or more preceding instructions preceding the watchpoint instruction in the pipeline, wherein completion of execution of the one or more preceding instructions may change one or more associated permanent registers.

16. The invention of claim 14, wherein, before halting the processing of the processor, the processor erases any intermediate values written to any temporary registers by the watchpoint instruction and any subsequent instruction in the pipeline.

17. The invention of claim 14, wherein:
the system halts the processing of the processor in a "break before make" manner;
before halting the processing of the processor, the processor operates for one or more time cycles following detection of the watchpoint event to complete execution of one or more preceding instructions preceding the watchpoint instruction in the pipeline, wherein completion of execution of the one or more preceding instructions may change one or more associated permanent registers;

before halting the processing of the processor, the processor erases any intermediate values written to any temporary registers by the watchpoint instruction and any subsequent instruction in the pipeline;

before halting the processing of the processor, the processor operates for at least one time cycle to execute at least one non-final stage for the watchpoint instruction to place the processor in an equivalent state equivalent to the state prior to detection of the watchpoint event;

after halting the processing of the processor, the processor resumes processing of the watchpoint instruction in the pipeline, wherein the processor stores data to enable the processor to resume processing of the watchpoint instruction in the pipeline; and the system further comprises an emulation unit that detects the watchpoint event, instructs the processor to halt its processing, and subsequently instructs the processor to resume its processing, wherein the processor, the memory, and the emulation unit are implemented as a single integrated circuit.

18. The invention of claim 14, wherein, before halting the processing of the processor, the processor operates for at least one time cycle to execute at least one non-final stage for the watchpoint instruction to place the processor in an equivalent state equivalent to the state prior to detection of the watchpoint event.

19. The invention of claim 14, wherein, after halting the processing of the processor, the processor resumes processing of the watchpoint instruction in the pipeline, wherein the processor stores data to enable the processor to resume processing of the watchpoint instruction in the pipeline.

20. A system comprising:

memory; and a processor that implements instructions in a pipeline manner in which execution of each instruction involves a plurality of stages over a plurality of time cycles, wherein:

the plurality of stages includes a plurality of non-final stages and a final stage;

at a given time cycle, each of a plurality of different instructions is at a different one of the stages in a pipeline;

the processor has one or more temporary registers (i) store intermediate values generated by processing instructions and (ii) that may be changed during the non-final stages of execution of an instruction and one or more permanent registers that may not be changed during the non-final stages of execution of an instruction;

the system detects a watchpoint event associated with execution of a watchpoint instruction at a non-final stage; and the system halts processing of the processor after changing at least one temporary register associated with execution of the watchpoint instruction, but before changing any permanent registers associated with execution of the watchpoint instruction or any subsequent instructions following the watchpoint instruction in the pipeline, wherein, before halting the processing of the processor, the processor erases any intermediate values written to any temporary registers by the watchpoint instruction and any subsequent instruction in the pipeline.

* * * * *